United States Patent
Oh et al.

(10) Patent No.: US 9,269,503 B2
(45) Date of Patent: Feb. 23, 2016

(54) TITANIUM OXIDE COMPOSITE COMPRISING GRAPHENE COATING ON TITANIUM OXIDE-BASED GRANULES, AND HYBRID SUPER CAPACITOR USING THE SAME

(71) Applicant: SAMHWA CAPACITOR CO., LTD., Yongin-si (KR)

(72) Inventors: Young Joo Oh, Seoul (KR); Jung Rag Yoon, Yongin-si (KR); Kyung Min Lee, Paju-si (KR); Byung Gwan Lee, Osan-si (KR)

(73) Assignee: SAMHWA CAPACITOR CO., LTD. (KR)

( * ) Notice: Subject to any disclaimer, the term of this patent is extended or adjusted under 35 U.S.C. 154(b) by 212 days.

(21) Appl. No.: 14/077,527

(22) Filed: Nov. 12, 2013

(65) Prior Publication Data

US 2014/0139973 A1    May 22, 2014

(51) Int. Cl.
*C01G 23/047* (2006.01)
*H01G 11/36* (2013.01)
*C01B 31/04* (2006.01)
*H01G 11/46* (2013.01)
*H01G 11/86* (2013.01)
*H01G 11/04* (2013.01)

(52) U.S. Cl.
CPC ............ *H01G 11/36* (2013.01); *C01B 31/0438* (2013.01); *C01G 23/047* (2013.01); *H01G 11/46* (2013.01); *H01G 11/86* (2013.01); *C01P 2004/61* (2013.01); *C01P 2004/80* (2013.01); *C01P 2006/12* (2013.01); *C01P 2006/80* (2013.01); *H01G 11/04* (2013.01); *Y02E 60/13* (2013.01)

(58) Field of Classification Search
CPC .. C01B 31/0438; C01G 23/04; C01G 23/047; B32B 9/007; C01P 2004/61; C01P 2004/80; C01P 2006/12; C01P 2006/80
USPC .................................. 428/403; 423/609, 610
See application file for complete search history.

(56) References Cited

U.S. PATENT DOCUMENTS

| 6,022,640 | A | 2/2000 | Takada et al. | |
| 8,257,867 | B2 * | 9/2012 | Liu et al. | 429/231.5 |
| 2010/0081057 | A1 * | 4/2010 | Liu et al. | 429/231.5 |
| 2011/0165465 | A1 * | 7/2011 | Kim et al. | 429/231.5 |
| 2012/0064409 | A1 * | 3/2012 | Zhamu et al. | 429/221 |

FOREIGN PATENT DOCUMENTS

KR    1020110013460    2/2011

* cited by examiner

*Primary Examiner* — Holly Le
(74) *Attorney, Agent, or Firm* — Cantor Colburn LLP

(57) ABSTRACT

A titanium oxide composite, a titanium oxide composite manufacturing method, and a super capacitor using the same are provided. The titanium oxide composite is prepared to surround graphene on a surface of titanium oxide granules. One of a granular $Li_xTi_yO_z$ and a granular $H_xTi_yO_z$ is selected and thereby used for the granular titanium oxide, the granular $Li_xTi_yO_z$ satisfies $1 \leq x \leq 4$, $1 \leq y \leq 5$, and $1 \leq z \leq 12$, and the granular $H_xTi_yO_z$ satisfies $1 \leq x \leq 2$, $1 \leq y \leq 12$, and $1 \leq z \leq 25$.

3 Claims, 6 Drawing Sheets

TITANIUM OXIDE COMPOSITE COMPRISING GRAPHENE COATING ON TITANIUM OXIDE-BASED GRANULES, AND HYBRID SUPER CAPACITOR USING THE SAME

CROSS-REFERENCE TO RELATED APPLICATION

This application claims the benefit of Korean Patent Application No. 10-2012-0132500, filed on Nov. 21, 2012, in the Korean Intellectual Property Office, the disclosure of which is incorporated herein by reference.

BACKGROUND OF THE INVENTION

1. Field of the Invention

The present invention relates to a titanium oxide composite, a titanium oxide composite manufacturing method, and a super capacitor using the same. More particularly, the present invention relates to a titanium oxide composite in which an electronic conductivity is enhanced by forming graphene on a surface of granular titanium oxide, a titanium oxide composite manufacturing method, and a hybrid super capacitor using the same.

2. Description of the Related Art

A super capacitor is used for a large capacity energy storage device and technology for electrode materials is under development in order to increase a density of energy to be stored. In view of the battery performance of the super capacitor, a cathode material may play an important role. Lithium-titanium oxide (LTO) has a structurally stable spinel structure as a cathode active material.

Due to a "zero-strain" characteristic that a volume expansion barely occurs in charging and discharging, LTO may have an advantage such as a high cyclic characteristic. Accordingly, LTO has been currently used as a cathode material having a high output and a long lifespan, for example, an electrode material of an ultra high capacity super capacitor.

Korean Laid-Open Publication No. 2011-0013460 discloses a manufacturing method of LTO including mixing lithium carbonate powers or lithium hydroxide powders with titanium oxide by using the titanium oxide as a sintering precursor; using, as the sintering precursor, a titanium and lithium containing compound from a solution containing both titanium and lithium components; and manufacturing a mixture of titanium compound powders and lithium compound by manufacturing a mixture slurry of titanium compound powders and lithium-containing compound and then depositing the lithium compound through spray drying; and using the mixture as the sintering precursor.

The conventional LTO manufactured according to the disclosure of Korean Laid-Open Publication No. 2011-0013460 has a difficult in fast charging and discharging due to a low electronic conductivity. In addition, a theoretical capacity is about 175 mAh/g and thus, is low.

SUMMARY OF THE INVENTION

The present invention provides a titanium oxide composite in which an electronic conductivity is enhanced by forming graphene on a surface of granular titanium oxide, a titanium oxide composite manufacturing method, and a hybrid super capacitor using the same.

The present invention also provides a titanium oxide composite that may perform fast charging and discharge by forming graphene on a surface of granular titanium oxide and thereby enhancing an electronic conductivity, a titanium oxide composite manufacturing method, and a hybrid super capacitor using the same.

According to an aspect of the present invention, there is provided a titanium oxide composite, wherein graphene is formed to surround a surface of granular titanium oxide. One of a granular $Li_xTi_yO_z$ and a granular $H_xTi_yO_z$ may be selected and thereby used for the granular titanium oxide. The granular $Li_xTi_yO_z$ may satisfy $1 \leq x \leq 4$, $1 \leq y \leq 5$, and $1 \leq z \leq 12$, the granular $H_xTi_yO_z$ may satisfy $1 \leq x \leq 2$, $1 \leq y \leq 12$, and $1 \leq z \leq 25$.

According to another aspect of the present invention, there is provided a method of manufacturing a titanium oxide composite, the method including: coating graphene oxide on a surface of granular titanium oxide using an electrostatic force such that the graphene oxide surrounds the surface of the granular titanium oxide; and performing reduction processing of the graphene oxide coated on the surface of the granular titanium oxide to be graphene.

According to still another aspect of the present invention, there is provided a hybrid super capacitor, including: an anode including a first collector and an anode active material member formed on the first collector; and a cathode including a second collector disposed to face the anode and a cathode active material member formed on the second collector. The anode active material member may include activated carbon, the cathode active material member includes a titanium oxide composite, the titanium oxide composite may include granular titanium oxide of about 70 wt % to about 99 wt % and graphene of about 1 wt % to about 30 wt %. One of a granular $Li_xTi_yO_z$ and a granular $H_xTi_yO_z$ may be selected and thereby used for the granular titanium oxide, the granular $Li_xTi_yO_z$ may satisfy $1 \leq x \leq 4$, $1 \leq y \leq 5$, and $1 \leq z \leq 12$, the granular $H_xTi_yO_z$ may satisfy $1 \leq x \leq 2$, $1 \leq y \leq 12$, and $1 \leq z \leq 25$.

BRIEF DESCRIPTION OF THE DRAWINGS

The above and/or other aspects of the present invention will become apparent and more readily appreciated from the following description of the exemplary embodiments, taken in conjunction with the accompanying drawings in which.

DETAILED DESCRIPTION OF THE INVENTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, a titanium oxide composite, a titanium oxide composite manufacturing method, and a hybrid super capacitor using the same according to embodiments of the present invention will be described with reference to the accompanying drawings.

Figure 1:
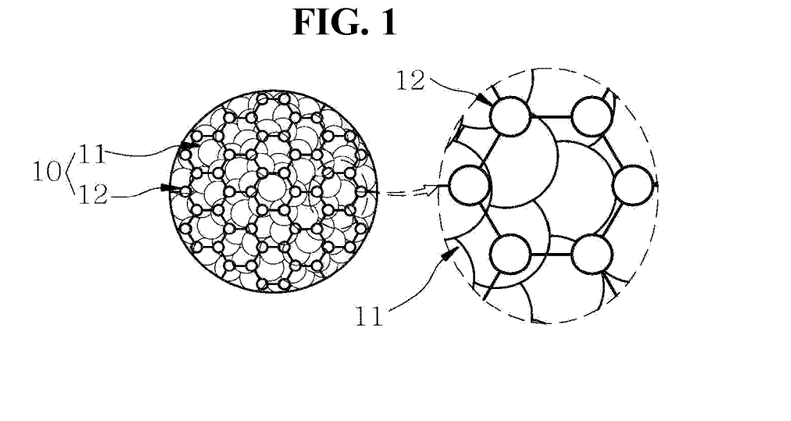
FIG. 1 is a front view of a titanium oxide composite of the present invention.
Figure 2:
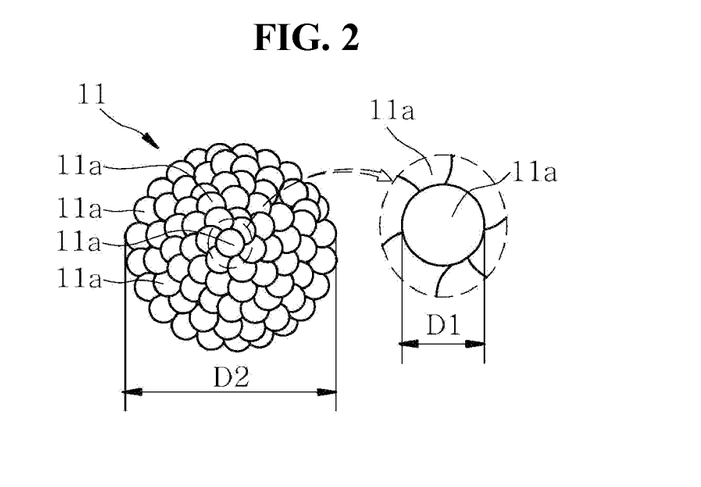
FIG. 2 is a front view of granular titanium oxide of FIG. 1.
Figure 3:
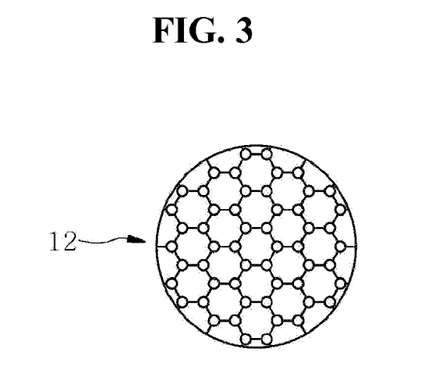
FIG. 3 is a front view of graphene of FIG. 1.

Referring to FIGS. 1 through 3, a titanium oxide composite 10 of the present invention is formed such that graphene 12 forms on and surround a surface of granular titanium oxide 11. The granular titanium oxide 11 is formed of titanium oxide granules. The graphene 12 having a specific surface area of 500 m$^2$/g to 2500 m$^2$/g may be used. Such titanium oxide composite 10 may include a granular titanium oxide of 70 wt % to 99 wt % and graphene of 1 wt % to 30 wt %. To form the graphene 12 so as to surround the surface of the granular titanium oxide 11, i.e., to surround the surface of the individual titanium oxide granules, an electrostatic force occurring between the granular titanium oxide 11 of which surface positive charge is applied on and graphene oxide 12a of FIG. 4 having negative charge may be used.

One of a granular $Li_xTi_yO_z$ and a granular $H_xTi_yO_z$ may be selected and thereby used for the granular titanium oxide 11. The granular $Li_xTi_yO_z$ may satisfy 1≤x≤4, 1≤y≤5, and 1≤z≤12, the granular $H_xTi_yO_z$ may satisfy 1≤x≤2, 1≤y≤12, and 1≤z≤25.

The granular $Li_xTi_yO_z$ of which an average particle size (D2) of a final phase is 4 μm to 60 μm and of which a specific surface area is 4 m$^2$/g to 100 m$^2$/g may be used. The granular $H_xTi_yO_z$ of which an average particle size (D2) of a final phase is 4 μm to 60 μm and of which a specific surface area is 4 m$^2$/g to 100 m$^2$/g may be used. Each of the granular $Li_xTi_yO_z$ and the granular $H_xTi_yO_z$ may be manufactured using one of disk type, two-fluid nozzle type, and four-fluid nozzle type spray driers.

As compared to the granular $Li_xTi_yO_z$, the granular $H_xTi_yO_z$ may have a high energy density by about 30%. Since a lithium (Li) precursor is not used, synthesis may be performed in a low temperature, thereby saving manufacturing cost. Accordingly, a hybrid super capacitor having a capacity greater than a hybrid super capacitor using $Li_xTi_yO_z$ may be embodied.

As described above, the titanium oxide composite 10 of the present invention may enhance an electronic conductivity since the graphene 12 having an excellent conductivity and electron transport capability is coated to surround the granular titanium oxide 11 such as the granular $Li_xTi_yO_z$ or the granular $H_xTi_yO_z$, for example.

Hereinafter, a method of manufacturing a titanium oxide composite constructed as above according to an embodiment of the present invention will be described.

Figure 4:
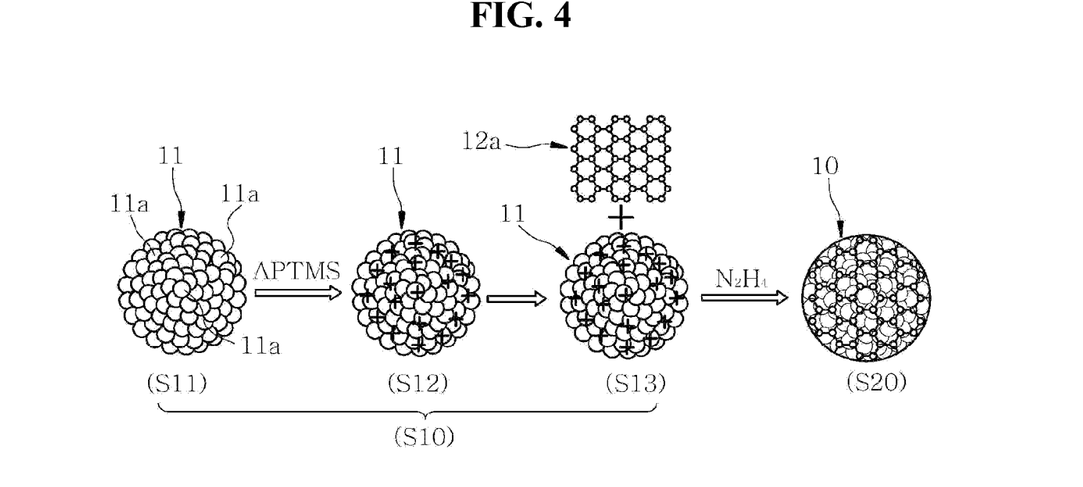
FIG. 4 is a process diagram illustrating a process of manufacturing a titanium oxide composite of the present invention.

Referring to FIG. 4, the titanium oxide composite manufacturing method of the present invention may coat graphene oxide 12a on the surface of the granular titanium oxide 11 using an electrostatic force such that the graphene oxide 12a surrounds individual titanium oxide granules of the granular titanium oxide 11 (S10). When the graphene oxide 12a is coated to surround the surface of the granular titanium oxide 11, reduction processing of the graphene oxide 12a coated on the surface of the granular titanium oxide 11 to be the graphene 12 may be performed (S20). Through this, the titanium oxide composite 10 may be manufactured.

To manufacture the titanium oxide composite 10, the method of coating the graphene oxide 12a on the surface of the titanium oxide granule of the granular titanium oxide 11 may prepare the granular titanium oxide 11 (S11).

When the granular titanium oxide 11 is prepared, positive charge may be applied by coating $NH_2$ on the surface of the granular titanium oxide 11 (S12). $NH_2$ for applying the positive charge on the surface of the granular titanium oxide 11 may be coated on the surface of the granular titanium oxide 11 using APTMS (3-aminopropyl-trimethoxysilane).

When the positive charge is applied on the surface of the granular titanium oxide 11, the graphene oxide 12a having negative charge may be coated on the surface of the granular titanium oxide 11 having the positive charge using an electrostatic force in such a way that the graphene oxide 12a surrounds individual titanium oxide granules of the granular titanium oxide 11 (S13). The graphene oxide 12a coated on the surface of the granular titanium oxide 11 may be manufactured through a chemical oxidation and reduction processing using a HUMMER method. The graphene oxide 12a coated on the surface of the granular titanium oxide 11 may be reduced to be the graphene 12 using hydrazine ($N_2H_4$).

One of a granular $Li_xTi_yO_z$ and a granular $H_xTi_yO_z$ may be selected and thereby used for the granular titanium oxide 11 used to surround the graphene oxide 12a. The granular $Li_xTi_yO_z$ may be formed using one of a solid phase method, a sol-gel method, and a hydrothermal synthetic method. The granular $H_xTi_yO_z$ may be formed using the solid phase method after ion exchange.

Hereinafter, a method of forming the granular $Li_xTi_yO_z$ or the granular $H_xTi_yO_z$ in operation S11 of preparing the granular titanium oxide 11 will be further described.

Figure 5:
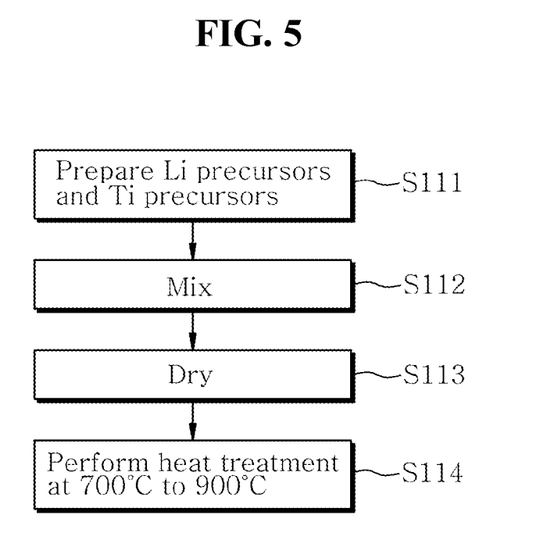
FIGS. 5 through 8 are flowcharts illustrating embodiments of the process of manufacturing titanium oxide of FIG. 4, respectively.

Referring to FIG. 5, a method of forming the granular $Li_xTi_yO_z$ using the solid phase method may prepare a plurality of lithium (Li) precursors and a plurality of titanium (Ti) precursors (S111). One of LiOH and $Li_2CO_3$ may be selected and thereby used for each of the plurality of lithium (Li) precursors. One of $TiO_2$, $TiO(OH)_2$, and $Ti(OCH_2CH_2O)$ may be selected and thereby used for each of the plurality of titanium (Ti) precursors.

When the plurality of lithium (Li) precursors and the plurality of titanium (Ti) precursors is prepared, a plurality of primary phases 11a having an average particle size D1 (see FIG. 2) of 100 nm to 800 nm may be formed by applying an ultrasound or mechanical mixing method to the plurality of lithium (Li) precursors and the plurality of titanium (Ti) precursors (S112). Here, the mechanical mixing method may refer to a ball-mill method, for example.

When the plurality of primary phases 11a is formed, the plurality of primary phases 11a may be dried using one of a spray drier (not shown) and a mechano-chemical reaction method (S113). A spray drier having two-fluid or four-fluid nozzle may be used to dry the plurality of primary phases 11a.

When the plurality of primary phases 11a is dried, a final phase granular $Li_xTi_yO_z$ having an average particle size D2 (see FIG. 2) of 4 μm to 60 μm may be formed by performing a heat treatment on the plurality of primary phases 11a under the atmosphere of 700° C. to 900° C. for 2 to 12 hours (S114). Here, the final phase granular $Li_xTi_yO_z$ may be formed to satisfy 1≤x≤4, 1≤y≤5, and 1≤z≤12. An embodiment of the final phase granular $Li_xTi_yO_z$, that is, a chemical reaction formula of $Li_4Ti_5O_{12}$ may be "$5TiO_2 + 2Li_2CO_3 \rightarrow Li_4Ti_5O_{12} + 2CO_2\uparrow$".

Figure 6:
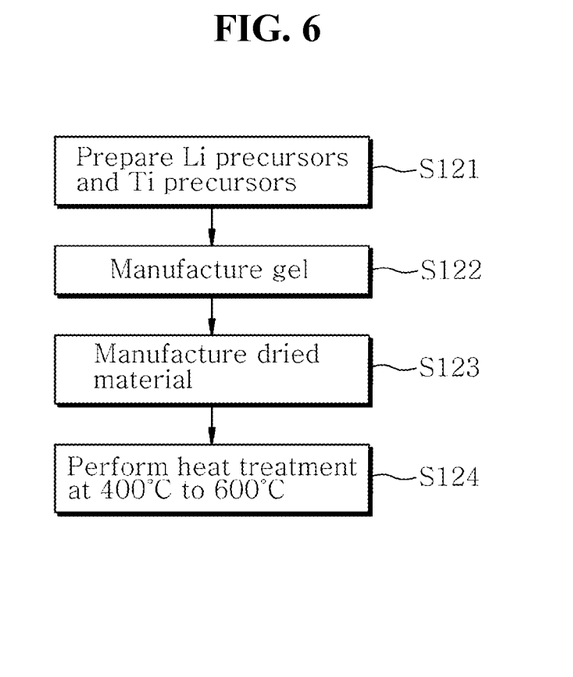

Referring to FIG. 6, a method of forming the granular $Li_xTi_yO_z$ using the sol-gel method may prepare a plurality of $LiNO_3$ (lithium nitrate) precursors and a plurality of $Ti[OCH(CH_3)_2]_4$ (tetrabutyl orthotinate) precursors (S121). When the plurality of $LiNO_3$ precursors and the plurality of $Ti[OCH(CH_3)_2]_4$ precursors is prepared, the plurality of $LiNO_3$ precursor and the plurality of $Ti[OCH(CH_3)_2]_4$ precursors may be dissolved using ethanol or distilled water and then be in a gel state by increasing viscosity using a spin drier (S122). When the gel is manufactured, a dried material may be manufactured by drying the gel at 80° C. to 100° C. for 12 to 72 hours using a forced-circulation oven (S123). When the dried material is manufactured, the final phase granular $Li_xTi_yO_z$ having an average particle size D2 (see FIG. 2) of 4 μm to 60 μm may be formed by performing a heat treatment on the dried material under the atmosphere of 80° C. to 100° C.

(S124). The heat treatment on the dried material may be performed using a spray dry method or a mechano-chemical reaction method.

Figure 7:
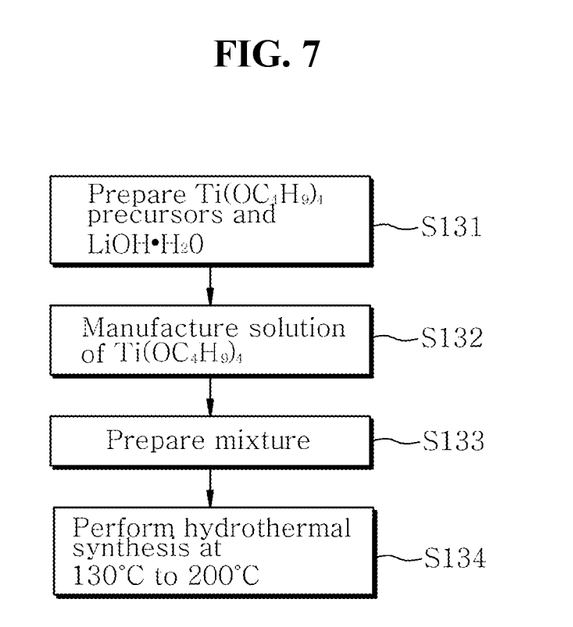

Referring to FIG. 7, a method of forming the granular $Li_xTi_yO_z$ using the hydrothermal synthetic method may prepare $LiOH \cdot H_2O$ (lithium hydroxide mono-hydrate) and $Ti(OC_4H_9)_4$ (tetrabutyl titanate) (S131). When $LiOH \cdot H_2O$ and $Ti(OC_4H_9)_4$ are prepared, a solution of $Ti(OC_4H_9)_4$ may be prepared by mixing $Ti(OC_4H_9)_4$ and ethanol (S132). When the solution of $Ti(OC_4H_9)_4$ is prepared, a mixture of $Ti(OC_4H_9)_4$ and $LiOH \cdot H_2O$ may be prepared by mixing $LiOH \cdot H_2O$ into the solution of $Ti(OC_4H_9)_4$ (S133). The mixture of $Ti(OC_4H_9)_4$ and $LiOH \cdot H_2O$ may be prepared by dropping $LiOH \cdot H_2O$ into the solution of $Ti(OC_4H_9)_4$. When the mixture of $Ti(OC_4H_9)_4$ and $LiOH \cdot H_2O$ is prepared, the final phase granular $Li_xTi_yO_z$ having an average particle size D2 (see FIG. 2) of 4 μm to 60 μm may be formed by performing a hydrothermal synthesis on the mixture of $Ti(OC_4H_9)_4$ and $LiOH \cdot H_2O$ at 130 C to 200° C. using autoclave (S134).

Figure 8:
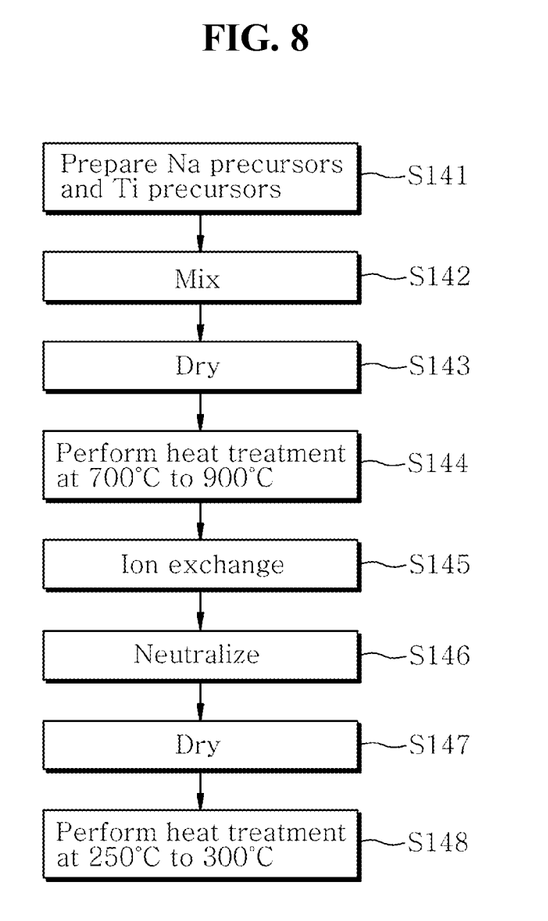

Referring to FIG. 8, a method of forming the granular $H_xTi_yO_z$ using the solid phase method after ion exchange may prepare a plurality of sodium (Na) precursors and a plurality of titanium (Ti) precursors (S141). Here, one of $Na_2CO_3$, NaOH, and $Na_2O$ may be selected and thereby used for each of the plurality of sodium (Na) precursors, and each of $TiO_2$, $TiO(OH)_2$, and $Ti(OCH_2CH_2O)$ may be selected and thereby used for each of the plurality of titanium (Ti) precursors.

When the plurality of sodium (Na) precursors and the plurality of titanium (Ti) precursors is prepared, a plurality of primary phases 11a having an average particle size D1 (see FIG. 2) of 10 nm to 500 nm may be formed by applying an ultrasound or mechanical mixing method to the plurality of sodium (Na) precursors and the plurality of titanium (Ti) precursors (S142). When the plurality of primary phases 11a is formed, the plurality of primary phases 11a may be dried in an oven at 60° C. to 100° C. for 10 to 20 hours (S143).

When the plurality of primary phases 11a is dried, a granular $Na_xTi_yO_z$ may be formed by performing a heat treatment on the dried primary phases 11a under the atmosphere of 700° C. to 800° C. for 24 to 48 hours (S144). The granular $Na_xTi_yO_z$ may be formed to satisfy 1≤x≤2, 1≤y≤3, and 1≤z≤7. An embodiment of the granular $Na_xTi_yO_z$, that is, a chemical reaction formula of $Na_2Ti_3O_7$ may be "$3TiO_2 + Na_2CO_3 \rightarrow Na_2Ti_3O_7 + CO_2 \uparrow$". When the granular $Na_xTi_yO_z$ is formed, the granular $H_xTi_yO_z$ may be formed by processing the granular $Na_xTi_yO_z$ in a chloride solution of 60° C. to 70° C. for 3 to 5 days and thereby performing ion exchange (S145). Here, the granular $H_xTi_yO_z$ may be formed by exchanging sodium (Na) ions include in the granular $Na_xTi_yO_z$ to be hydrogen (H) ions using hydrogen chloride (HCl) having a concentration of 0.1 mol to 1 mol (M) in the chloride (HCl) solution.

When the granular $H_xTi_yO_z$ is formed, the granular $H_xTi_yO_z$ may be neutralized to have a pH of 7 to 8 using water or ethanol (S146). When the granular $H_xTi_yO_z$ is neutralized to have a pH of 7 to 8, the granular $H_xTi_yO_z$ may be dried using a spray drier (S147). When the granular $H_xTi_yO_z$ is dried, the final phase granular $H_xTi_yO_z$ having an average particle size D2 (see FIG. 2) of 4 μm to 60 μm may be formed by performing a heat treatment on the dried granular $H_xTi_yO_z$ under the atmosphere of 250° C. to 350° C. for 5 to 10 hours (S148). The final phase granular $H_xTi_yO_z$ may be formed to satisfy 1≤x≤2, 1≤y≤12, and 1≤z≤25. An embodiment of the final phase granular $H_xTi_yO_z$ may be $H_2Ti_{12}O_{25}$.

Hereinafter, a hybrid super capacitor using the titanium oxide composite 10 manufactured according to the titanium oxide composite manufacturing method of the present invention will be described.

Figure 9:
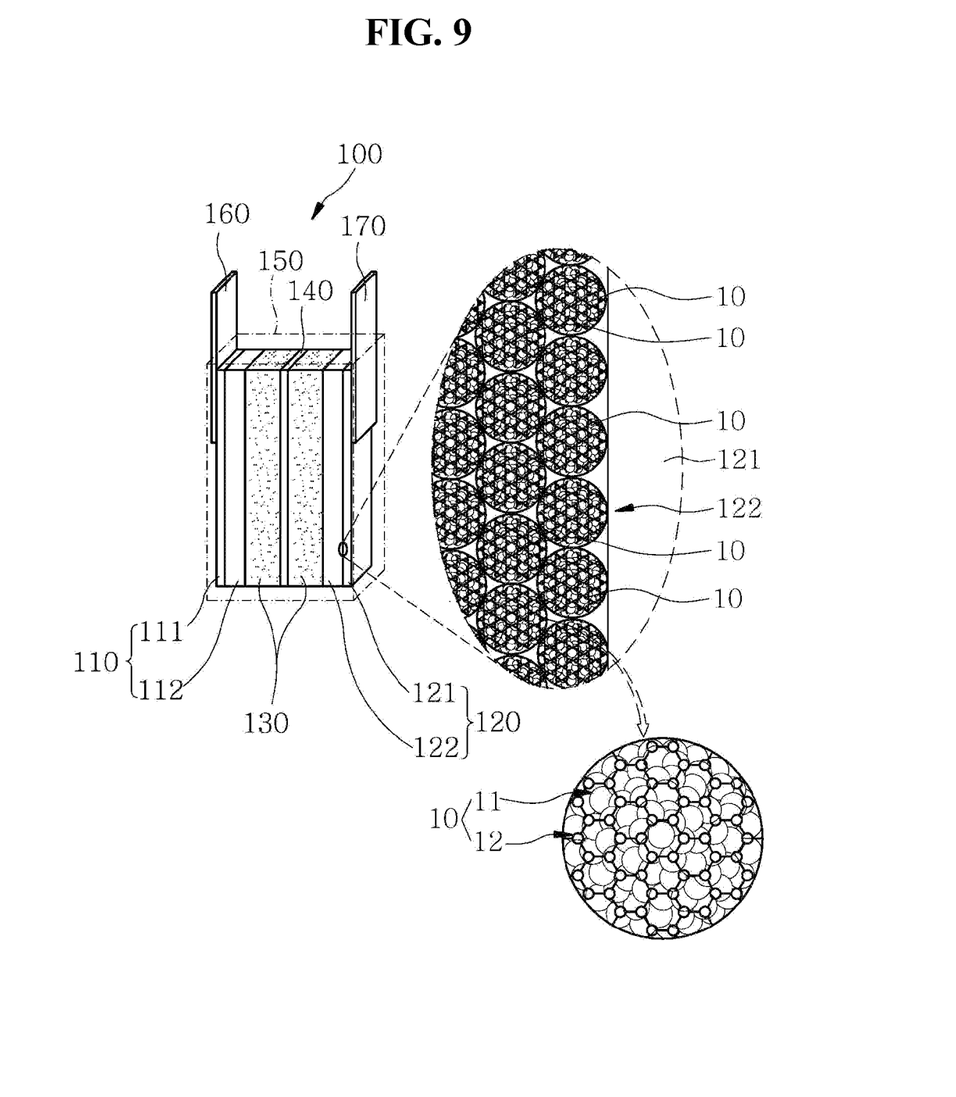
FIG. 9 is a cross-sectional view of a hybrid super capacitor to which the titanium oxide composite of the present invention is applied.

Referring to FIG. 9, a hybrid super capacitor 100 of the present invention may include an anode 110, a cathode 120, an electrolyte 130, a separating film 140, a receiving case 150, and lead members 160 and 170.

The anode 110 may include a first collector 111 and an anode active material member 112. The anode active material member 112 may include activated carbon, and may be formed on a whole surface of one side of the first collector 111. The cathode 120 may include a second collector 121 disposed to face the anode 110 and a cathode active material member 122. The cathode active material member 122 may be formed on a whole surface of another side of the second collector 121, and may use the titanium oxide composite of the present invention. The titanium oxide composite may include a granular titanium oxide of 70 wt % to 99 wt % and graphene of 1 wt % to 30 wt %. One of a granular $Li_xTi_yO_z$ and a granular $H_xTi_yO_z$ may be selected and thereby used for the granular titanium oxide 11. The granular $Li_xTi_yO_z$ may satisfy 1≤x≤4, 1≤y≤5, and 1≤z≤12, and the granular $H_xTi_yO_z$ may satisfy 1≤x≤2, 1≤y≤12, and 1≤z≤25.

The electrolyte 130 may be formed between the anode 110 and the cathode 120, and lithium salt may be used. Such lithium salt may use one of $LiClO_4$, $LiN(CF_4SO2)_2$, $LiBF_4$, $LiCF_3SO_3$, $LiPF_6$, $LiSbF_6$, and $LiAsF_6$. The separating film 140 may be formed between the anode 110 and the cathode 120 to thereby prevent the anode 110 and the cathode 120 from being electrically connected in contact with each other and thereby being shorted. A porous separating film may be used. One of polypropylene base, polyethylene base, and polyolefin base may be used for the porous separating film. The receiving case 150 may be mounted to be inserted with each of the anode 110, the cathode 120, the electrolyte 130, and the separating film 140. The lead members 160 and 170 may be connected to the first collector 111 of the anode 110 and the second collector 121 of the cathode 120, respectively. As described above, the hybrid super capacitor 100 of the present invention may enhance an electronic conductivity by using the titanium oxide composite 10 as the cathode active member 122, thereby enabling fast charging and discharging.

As described above, a titanium oxide composite, a titanium oxide composite manufacturing method, and a hybrid super capacitor according to the present invention may enhance an electronic conductivity by forming graphene on a surface of granular titanium oxide to surround the granular titanium oxide, thereby enabling fast charging and discharging.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:
1. A titanium oxide composite, comprising:
a granular titanium oxide including titanium oxide granules; and
a graphene formed on a surface of the individual titanium oxide granules, the graphene surrounding the individual titanium oxide granules,
wherein the granular titanium oxide includes a granular $Li_xTi_yO_z$ and a granular $H_xTi_yO_z$, wherein the granular

$Li_xTi_yO_z$ satisfies $1 \leq x \leq 4$, $1 \leq y \leq 5$, and $1 \leq z \leq 12$, and the granular $H_xLi_yO_z$ satisfies satisfy $1 \leq x \leq 2$, $1 \leq y \leq 12$, and $1 \leq z \leq 25$, wherein the titanium oxide granules have an average particle size of about 4 μm to about 60 μm and a specific surface area of about 4 m$^2$/g to about 100 m$^2$/g, and wherein the graphene has a specific surface area of about 500 m$^2$/g to about 2500 m$^2$/g.

2. The titanium oxide composite of claim 1, wherein the titanium oxide composite comprises the granular titanium oxide of about 70 wt % to about 99 wt % and the graphene of about 1 wt % to about 30 wt %.

3. A hybrid super capacitor, comprising:

an anode comprising a first collector and an anode active material member formed on the first collector; and a cathode comprising a second collector disposed to face the anode and a cathode active material member formed on the second collector;

wherein the anode active material member comprises activated carbon, the cathode active material member comprises a titanium oxide composite, the titanium oxide composite comprises granular titanium oxide of about 70 wt % to about 99 wt % and graphene of about 1 wt % to about 30 wt %;

wherein the granular titanium oxide including titanium oxide granules, and the graphene formed on a surface of the individual titanium oxide granules and surrounding the individual titanium oxide granules;

wherein the titanium oxide granules have an average particle size of about 4 μm to about 60 μm and a specific surface area of about 4 m$^2$/g to about 100 m$^2$/g;

wherein the graphene has a specific surface area of about 500 m$^2$/g to about 2500 m$^2$/g; and wherein one of a granular $Li_xTi_yO_z$ and a granular $H_xTi_yO_z$ is selected and thereby used for the granular titanium oxide, the granular $Li_xTi_yO_z$ satisfies $1 \leq x \leq 4$, $1 \leq y \leq 5$, and $1 \leq z \leq 12$, and the granule type $H_xTi_yO_z$ satisfies $1 \leq x \leq 2$, $1 \leq y \leq 12$, and $1 \leq z \leq 25$.

* * * * *